United States Patent
Ezgi Akcora et al.

(10) Patent No.: US 12,271,411 B1
(45) Date of Patent: Apr. 8, 2025

(54) TECHNIQUES FOR IDENTIFYING SEMANTICALLY RELEVANT SEARCH RESULTS

(71) Applicant: Amazon Technologies, Inc., Seattle, WA (US)

(72) Inventors: Damla Ezgi Akcora, Luxembourg (LU); Amin Mantrach, Niederkorn (LU)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/416,602

(22) Filed: Jan. 18, 2024

(51) Int. Cl.
*G06F 16/33* (2019.01)
*G06F 16/334* (2025.01)

(52) U.S. Cl.
CPC ............... *G06F 16/3344* (2019.01)

(58) Field of Classification Search
CPC ................................ G06F 16/3344
See application file for complete search history.

(56) References Cited

U.S. PATENT DOCUMENTS

| | | | | |
|---|---|---|---|---|
| 11,640,432 | B2* | 5/2023 | Tuboguchi | G06F 16/90344 707/706 |
| 11,836,175 | B1* | 12/2023 | Malkiel | G06F 16/3346 |
| 12,013,885 | B2* | 6/2024 | Faruqui | G06N 3/04 |
| 12,147,485 | B2* | 11/2024 | Cui | G06F 16/9535 |
| 2014/0059030 | A1* | 2/2014 | Hakkani-Tur | G06F 16/84 707/706 |
| 2014/0280088 | A1* | 9/2014 | Speer | G06F 16/3347 707/723 |
| 2020/0394257 | A1* | 12/2020 | Santoso | G06F 16/9035 |
| 2021/0097063 | A1* | 4/2021 | Wan | G06F 16/24578 |
| 2021/0326751 | A1* | 10/2021 | Liu | G06N 3/084 |
| 2022/0414128 | A1* | 12/2022 | Raimondo | G06F 16/3344 |
| 2023/0325422 | A1* | 10/2023 | Sullivan | G06F 40/117 |
| 2023/0409647 | A1* | 12/2023 | Fleming | G06N 20/00 |
| 2024/0127026 | A1* | 4/2024 | Manandise | G06N 3/006 |

* cited by examiner

*Primary Examiner* — Jorge A Casanova
(74) *Attorney, Agent, or Firm* — Kilpatrick Townsend & Stockton LLP

(57) ABSTRACT

Techniques are described herein for generating a semantically related search query that differs by at least one lexical token from document data provided as input. A machine-learning model may be trained using supervised and/or deep learning algorithms and a training data set including historical queries and the document data identified as being semantically related to those queries. The semantically-related search query may be associated with the document and utilized in subsequent searches to match the document to a subsequent query based on identifying a lexical match between the subsequent search query and the semantically-related search query associated with the document. These techniques enable semantically related search queries to be assigned offline but utilized to identify semantically related documents using lexical matching techniques. Identifying these types of matches create more diverse search results while maintaining a high degree of relevance between the query and the documents of the result set.

20 Claims, 8 Drawing Sheets

TECHNIQUES FOR IDENTIFYING SEMANTICALLY RELEVANT SEARCH RESULTS

BACKGROUND

Conventional search engines often utilize multiple matching techniques to identify a result set for a given search query. These matching techniques may include lexical and semantic matching. In lexical matching, the search query is segmented into tokens that are compared to tokens of the documents on which the search is conducted to identify common tokens between the two. Semantic matching includes generating vector representations of both the search query and search items and comparing those vector representations to identify closest matches. Matches identified from both techniques may be combined to form a result set for the search query. In some situations, there may be high degree of overlap between the matches identified by the respective techniques. Semantic matching, by virtue of operating in embedded space is computationally expensive, much more so than lexical matching. Additionally, semantic matches are often detrimentally affected by ranking criteria. The techniques discussed herein provide improvements for identifying semantically related items for a search query.

BRIEF DESCRIPTION OF THE DRAWINGS

Various embodiments in accordance with the present disclosure will be described with reference to the drawings, in which.

DETAILED DESCRIPTION

Figure 1:
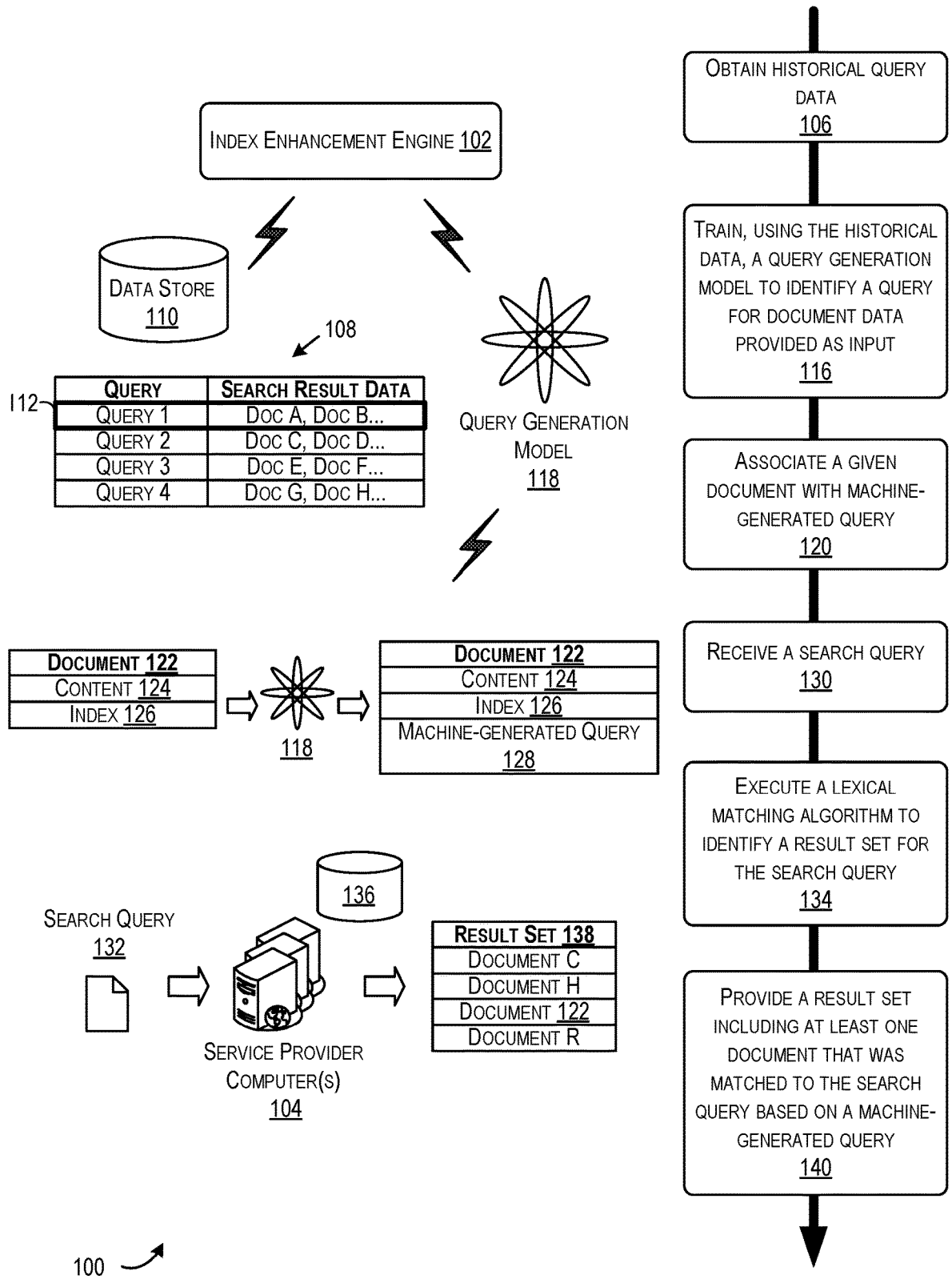
FIG. 1 is an example flow for identifying semantically relevant items for a search query utilizing lexical matching techniques, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Conventional search engines often employ both lexical and semantic matching techniques to identify search items (e.g., documents) that match a search query. Lexical matching includes matching tokens identified from the search query with tokens identified from the document metadata (e.g., document text, data/attributes associated with the document) to identify common tokens between the two. Semantic matching includes generating vector representations of the search query and document items in lower-dimensional semantic space and identifying document item vectors that are similar to the search query vector, indicating a semantic match between the search query and the document. In some cases, respective result sets for each type of matching may be identified and combined to generate a final result set for the search query. Semantic matching techniques are computationally expensive due to operating in embedded vector space.

Techniques described herein are directed to machine-learning techniques for identifying semantically relevant search results using lexical matching techniques. In some embodiments, a semantically-related search query may be generated by the system from document metadata (e.g., attributes or content of the document and/or data associated with the document such as a document index). A "semantically-related search query" refers to a search query that, when projected to low-dimensional semantic space, would be identified as being within a threshold degree of similarity to the document metadata, projected to the same semantic space. By way of example, a search query vector (e.g., a vector representation of a search query) may be considered semantically similar to a document vector (e.g., a vector representation of document content and/or document metadata such as an index of the document) if a distance computed between the two is less than a threshold distance, if a clustering algorithm would assign a common cluster to both vectors, or the like. In some embodiments, the semantically-related search query may be generated to include at least one lexical token that differs from those of the document data to which it corresponds. The semantically-related search query generated by the system (also referred to as a "machine-generated search query" or a "semantically similar search query") may be associated with the document. In some embodiments, the semantically-related search query may be added to a document index that associates the document with certain attributes, topics, or labels that can be used for identifying matches during a subsequent search.

During a subsequent search, a received search query may be matched (in whole, or in part) with the machine-generated search queries associated with one or more documents using lexical matching techniques. In some embodiments, a received search query may be identified as matching a machine-generated search query when any suitable portion (e.g., some, all) of the received search query matches any suitable portion (e.g., some, all) of the machine-generated search query. For example, a match may be identified when the whole of the received search query matches the whole of the machine-generated search query. If a match is found, the corresponding document may be added to the search result set and positioned within the set according to any suitable relevance and/or ranking criteria. The semantically-related search query includes at least one lexical token that differs from the document data with which it corresponds. As a result, use of the semantically-related search query enables a lexical match that would otherwise be unavailable using previous lexical matching techniques with the document data alone.

The disclosed techniques inject semantically relevant matches using computationally inexpensive (or at least less expensive) lexical matching techniques at search time, improve the semantic relevance of the final search result set, without incurring the overhead and computational costs for improving the conventional semantic matching process. Additionally, semantically matched search results are often subjected to ranking criterial and/or embedding generations may leverage customer behavioral data (e.g., clickthrough, number of clicks, number of orders, etc.) which may ultimately cause high overlap between lexical matches and semantic matches. The disclosed techniques expand the lexically matched documents to include search results (e.g., documents matched via the machine-generated search query) that would be unlikely to be identified by traditional lexical matching techniques (e.g., lexical matching between a search query and a document and/or associated document data which previously did not include a machine-generated search query that was generated to be semantically similar to the document/document index).

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example flow 100 for identifying semantically related items for a search query utilizing lexical matching techniques at search time, in accordance with at least one embodiment. The operations discussed in connection with FIG. 1 may be performed with an index enhancement engine 102, service provider computer(s) 104, or any suitable combination of the two. Service provider computer(s) 104 may provide various user interfaces for searching an electronic catalog of items using user-defined queries. In some embodiments, the index enhancement engine 102 may be provided as part of the service provider computer(s) 104 or, in whole or in part, by a system separate from the service provider computer(s) 104.

The flow 100 may begin at 106, where historical query data 108 may be obtained (e.g., from data store 110, a data store configured to store such information). Historical query data 108 may include any suitable data associated with previously submitted search queries including, but not limited to, a user-defined search query (e.g., a search query submitted via a user interface provided by service provider computer(s) 104) and search result data identifying one or more items of the electronic catalog that were matched to the user-defined search query. In some embodiments, the user-defined search query may include at least one lexical token that differs from those of the matched search result data instances. In some embodiments, the search result data may include any suitable document (e.g., a document specifying item attributes such as title, product description, price, review data, color, material, or any suitable data associated with a physical or digital item offered for consumption via the catalog of items), an index associated with the document (e.g., an index identifying a title, a product description, or any suitable label, tag, or identifier for the item specified by the attributes of the document). In some embodiments, vector representations of any suitable combination of the query, a matched document, and/or index associated with the matched document may be stored as part of the search result data of historical query data 108. In some embodiments, historical query data 108 may correspond to matches made between query and document(s) may include only those matched based on semantic matching techniques or the historical query data 108 may include matches made with at least one additional matching technique and filtered to include matches made via semantic matching techniques. By way of example, each historical query data instance may include any suitable number of tags, labels, or indicators indicating a method used to identify a match between a particular document and a given query. As a non-limiting example, document A of historical query data instance 112 may be associated with a label indicating that document A was matched to query 1 based on a lexical matching technique, while document B may be associated with a label indicating that document B was matched to query 1 based on a semantic matching technique. In some embodiments, document A may be filtered from the historical query data instance 112 (e.g., based on its associated label) to ensure that training data examples generated from historical query data instance 112 include matches made via semantic matching techniques and exclude matches made via techniques other than semantic matching.

At 116, query generation model 118, a machine-learning model, may be trained (e.g., by the index enhancement engine 102) to identity a query for document data provided as input. In some embodiments, index enhancement engine 102 may utilize any suitable portion of historical query data 108 (e.g., historical query data instances 112 and 114) as training data examples. In some embodiments, an instance of historical query data 108 may be used to generate any suitable number of training data examples. By way of example, a historical query instance identifying three documents that were matched to a given query via a semantic matching technique may be used to generate three individual training data examples, each training data example including data corresponding to a unique query/document pair. Any suitable number of training data examples may be utilized with a supervised learning algorithm to train query generation model 118. In some embodiments, query generation model 118 may be a recurrent neural network (RNN), a Long-Short-Term Memory (LSTM) network, a Gated Recurrent Unit (GRU) network, or the like. A method for training the query generation model 118 is discussed in more detail in connection with FIG. 3. Due to using only training data examples including matches that were identified using semantic matching techniques, the query generation model 118 can be trained to identify a semantically relevant query from document data provided as input.

At 120, a given document may be associated with a machine-generated query. By way of example, one or more documents may be identified which lack a machine-generated search query. These documents may be a subset of the documents identifying items of the electronic catalog. In some embodiments, these documents may be associated with a particular category, subcategory, genre, grouping, label, or the like that distinguish the subset from other documents of the electronic catalog. As a non-limiting example, the selected documents may correspond to popular items (e.g., documents corresponding to items for which item details/data has been viewed over a threshold number of times in a given historical period such as the last week, month, year, documents corresponding to items purchased over a threshold number of times in a given historical period, and the like) that lack an association to a machine-generated query (e.g., a query generated by query generation model 118). As part of an offline process, each of the documents identified (e.g., document 122) may be provided as input to the query generation model 118. Document 122 may include content 124 and, in some embodiments, document 122 may include or otherwise be associated with index 126. As a non-limiting example, content 124 may include any suitable combination of item attributes corresponding to an item of the electronic catalog. Index 126 may include any suitable labels, tags, or other associations with which the document is indexed. Any suitable data of content 124 and/or index 126 may be utilized at search time for matching purposes (e.g., via lexical and/or semantic matching techniques). In some embodiments, at least a portion of index 126 may include at least a portion of content 124. By way of example, content 124 may include a title and a product description attributes among other item attributes of a given item. Each item attribute of content 124 may include a corresponding attribute value for a given attribute. As a non-limiting example, "Acme robot vacuum" may be an attribute value corresponding to an attribute "title," indicating that the item specified by document 122 is an item having a title "Acme robot vacuum." In some embodiments, index 126 may include the title and product description (or any suitable combination of the item attributes and/or item attribute values of content 124 and/or any suitable number or type of attribute/attribute values that differ from those of content 124.

Document data corresponding to any suitable portion of document 122 (e.g., content 124 and/or index 126) may be provided as input to query generation model 118. In response to receiving this input, query generation model 118 may generate output corresponding to machine-generated query 128. In some embodiments, the machine-generated query 128 may be associate with document 122 in any suitable manner. In some embodiments, machine-generated query 128 may be added to index 126 or otherwise associated with document 122.

The operations discussed above may be performed any suitable number of times in order to identify machine-generated queries corresponding to any suitable number of documents. Each of the machine-generated queries generated by the query generation model 118 may include a semantically relevant query that is generated to be semantically similar to the document data to which it is associated. That is, the document associated with the semantically relevant query would be identified as a match if semantic matching techniques (e.g., the semantic matching techniques utilized for identifying semantic matches of historical query data 108) were employed to compare the two.

At 130, a search query (e.g., search query 132) may be received. In some embodiments, the received search query may be defined by a user via a user interface provided by service provider computer(s) 104. In some embodiments, the user interface may include a search bar with which a user may enter the parameters of search query 132.

At 134, a lexical matching algorithm may be executed with search query 132 to identify result set 138. Result set 138 may include documents corresponding to items of the electronic catalog (e.g., documents identified as matching the search query 132 based on the lexical matching algorithm). Executing the lexical matching algorithm may include generating a first set of tokens from the search query 132, generating a second set of tokens corresponding to a document (or corresponding document data) obtained from data store 136, and comparing the first and second set of tokens to identify common tokens. In some embodiments, a document may be matched to the search query 132 when the number of matching tokens meets a predefined criteria (e.g., the number of matching tokens meets/exceeds a predefined threshold). In some embodiments, additional matches may be identified using matching algorithms and/or techniques different from the lexical matching algorithm. As a non-limiting example, using lexical matching techniques, tokens generated from any suitable combination of an index (e.g., index 126), document content (e.g., content 124), and/or a machine-generated query (e.g., machine-generated query 128, provide as part of index 126, or as data separate from the index 126) may be compared to tokens generated from the search query 132 to determine that document 122 matches search query 132. Based at least in part on this determination, document 122 may be included in result set 138. In some embodiments, the result set 138 may be ordered and/or ranked (e.g., by the service provider computer(s) 104) according to a predefined ordering and/or ranking scheme prior to presentation (e.g., at the user interface with which search query 132 was originally submitted).

At 140, a result set (e.g., result set 138) may be provided. As depicted, the result set provided may include at least one document (e.g., document 122) that was matched to the search query 132 based on a machine-generated query (e.g., machine-generated query 128).

Figure 2:
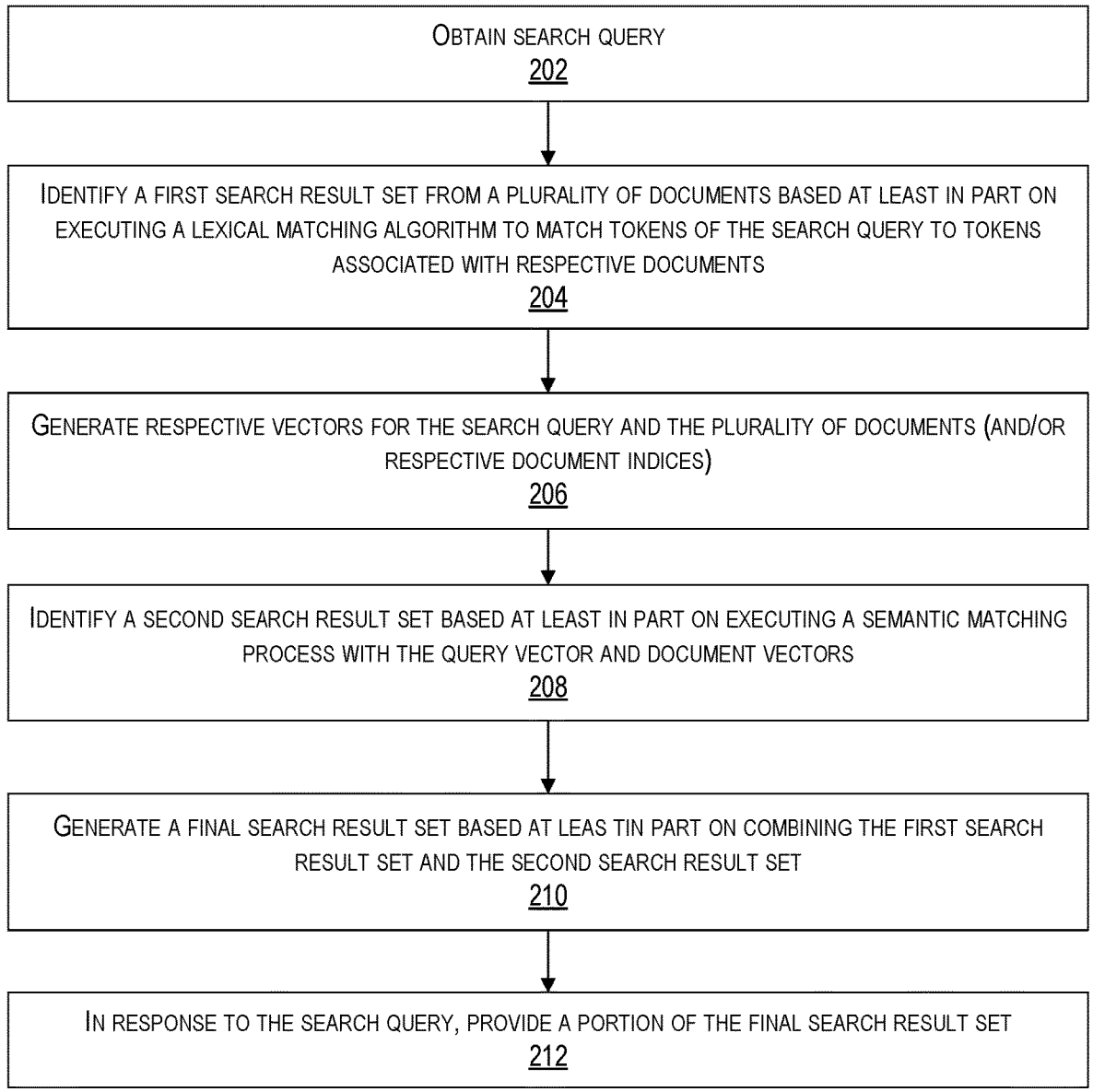
FIG. 2 is an example block diagram illustrating an example method for identifying a set of search results based at least in part on a received search query, in accordance with at least one embodiment.

FIG. 2 is an example block diagram illustrating an example method 200 for identifying a set of search results based at least in part on a received search query, in accordance with at least one embodiment. As described above, a variety of matching techniques/algorithms may be utilized to identify a set of search results (e.g., a set of documents corresponding to a set of items of an electronic catalog from which physical and/or digital items may be offered for consumption). Method 200 utilizes two matching techniques/algorithms, specifically, a lexical matching technique/algorithm and a semantic matching technique/algorithm. Conventional search engine may employ multiple matching techniques due to the fact that matching keywords/tokens of the document with search queries can be inaccurate due to differences in word choice or language style between the documents and queries.

The method 200 may begin at 202, where a search query may be obtained. As discussed in connection with FIG. 1, the search query may be received from a user interface (e.g., a user interface provided by service provider computer(s) 104 of FIG. 1). The search query may include any suitable search criteria and/or terms. By way of example, a search query may include "Acme Kitchen Mixer."

At 204, a first search result set may be identified based at least in part on executing a lexical matching algorithm to match tokens of the search query to tokens associated with a document. As part of the lexical matching algorithm, the search query may be segmented (separated) from a string of characters into tokens based at least in part on a predefined tokenization protocol. In some embodiments, a token may be assigned a token name corresponding to a category of a rule-based lexical unit and a token value identifying a portion of the original string that corresponds to a given token. As a non-limiting example, the search query "Acme Kitchen Mixer" may be segmented into any suitable number of tokens including any suitable combination of: "Acme," "Kitchen," "Mixer," "Acme Kitchen," "Kitchen Mixer," and "Acme Kitchen Mixer." Any suitable portion of a document and/or corresponding document index may be likewise segmented into tokens. In some embodiments, the document index includes key data (e.g., particular attributes/values corresponding to the title and product description of an item represented by the document) and/or keywords previously identified within the document (e.g., keywords identified based at least in part on a term frequency inverse document frequency (TF-IDF) analysis). The tokens generated from the search query may be compared to the token generated from a document and/or document index. A match between the document and the search query may be identified when a predefined set of criteria are met. As a non-limiting example, identifying that a threshold number, percentage, or ratio of search query tokens match respective token(s) of a document may cause the document to be identified as a match for the search query. All matches may be included in the first search result set.

At 206, respective vectors may be generated for the search query and each of the plurality of documents (or respective document indices) being searched (e.g., the documents of data store 136 of FIG. 1, corresponding to items offered for consumption via an electronic catalog). Generating these vectors may include executing a vectorization process. In some embodiments, executing the vectorization process on input (e.g., a search query, a document, etc.) converts the input to a vector of numerical data. This conversion may be performed by any suitable encoder. As a non-limiting example, executing the vectorization process on document may include calculating (e.g., by an encoder) a TF-IDF score for every word in the plurality of documents. A TF-IDF score may be calculated based on identifying a term frequency (TF) of a particular term (e.g., a frequency the particular term relative to the document) and an inverse document frequency (IDF) that quantifies how common/ uncommon the particular term is against the corpus of all words in the plurality of documents. A TF-IDF score may be calculated based at least in part on multiplying the TF value by the IDF value. The higher the TF IDF score, the more important/relevant the term is. The importance/relevancy of a term lower the closer the TF IDF score approaches a value of zero.

Other vectorization processes are contemplated. For example, a transformer-based machine-learning model (e.g., BERT) and/or other deep-learning models may be used to convert phrases, words, etc. into vectors. In some embodiments, the vectors may factor in semantic meaning and/or context of words of the input. As an example, a convolutional neural network may be used to identify a vector for input data. Convolutional neural networks are a class of deep neural networks that may be used to identify patterns in images, natural language processing, signal processing and the like. CNNs may include any suitable number of layers such as convolutional layers (e.g., configured to detect certain features of the input based on one or more filters, a layer that performs a convolution operation to input and passes the result to the next layer), rectified linear unit layers (e.g., configured to remove unwanted numbers such as negative numbers), pooling layers (e.g., layers that take a larger input and distill the input to a smaller form), and flattening layers (e.g., a layer configured to convert two-dimensional arrays from pooled features into a single, long continuous linear vector). As another example of a vectorization process, a projection matrix may be utilized to perform linear operations that map vector (e.g., vectors of the search query, document, and/or document index) into their projections of a subspace (e.g., a semantic subspace).

Any suitable encoder may be utilized to generate the query vector and document vectors. In some embodiments, the encoder may be configured to generate vectors that represent the query/document in semantic space.

At 208, a second result set may be identified based at least in part on executing a semantic matching process with the query vector and document vectors (e.g., vectors generated for the document and/or document index). By way of example, a relevance score may be generated between the query and a given document based at least in part on calculating a cosine similarity score between the query vector (e.g., the vector generated for the query based on the vectorization process discussed above at 204) and the document query (e.g., the vector generated for the document and/or document index based on the vectorization process discussed above at 204). In some embodiments, a clustering algorithm (e.g., K-nearest neighbor) may be used to cluster vectors with similar vectors based on a similarity measurement. In some embodiment, the query vector and document vectors may be clustered into any suitable number of clusters, and documents corresponding to the vectors of the cluster assigned to the query vector may be returned as the second result set. Using these semantic matching techniques, a query and document may be identified with a high similarity score, despite lacking any common terms. Lexical techniques such as those discussed above at 204 would fail at identifying the similarity between a query and semantically similar documents when the query and document have no common terms.

At 210, a final search result set may be generated based at least in part on combining the first search result set and the second search result set. In some embodiments, each of the documents of the first search result set and second result set may be combined and ranked according to any suitable ranking criteria (e.g., ranking documents based at least in part on a frequency that the items corresponding to those documents that are viewed and/or purchased, with documents corresponding to items that are more frequently viewed and/or purchased being ranked higher in the set than documents corresponding to items that are less frequently viewed and/or purchased). In some embodiments, the documents of the final result list may be ranked according to a number of tokens shared with the query, the cosine similarity score calculated between vectors representing the query and the given document, or any suitable ranking protocol that identifies a set of predefined rules for combining the first and second search results according to one or more predefined criteria.

At 212, at least a portion (e.g., one, some, all, etc.) of the final search result set may be provided in response to the search query. The particular number of search results included in the portion provided may be determined based at least in part on a predefined selection protocol. As a non-limiting example, a predefined selection protocol may identify that a top 100 search result of any final search result set is to be provided in response to a given search result. As a result, the top 100 search results of the final search result set (or all of the search results of the final search result set if the final search result set includes 100 or less documents) may be provided in response to the search query. In some embodiments, the provided search results may be presented via any suitable user interface (e.g., via a user interface provided by the service provider computer(s) 104 of FIG. 1). The user interface may be the same or related to a user interface with which the search query was obtained at 202.

Figure 3:
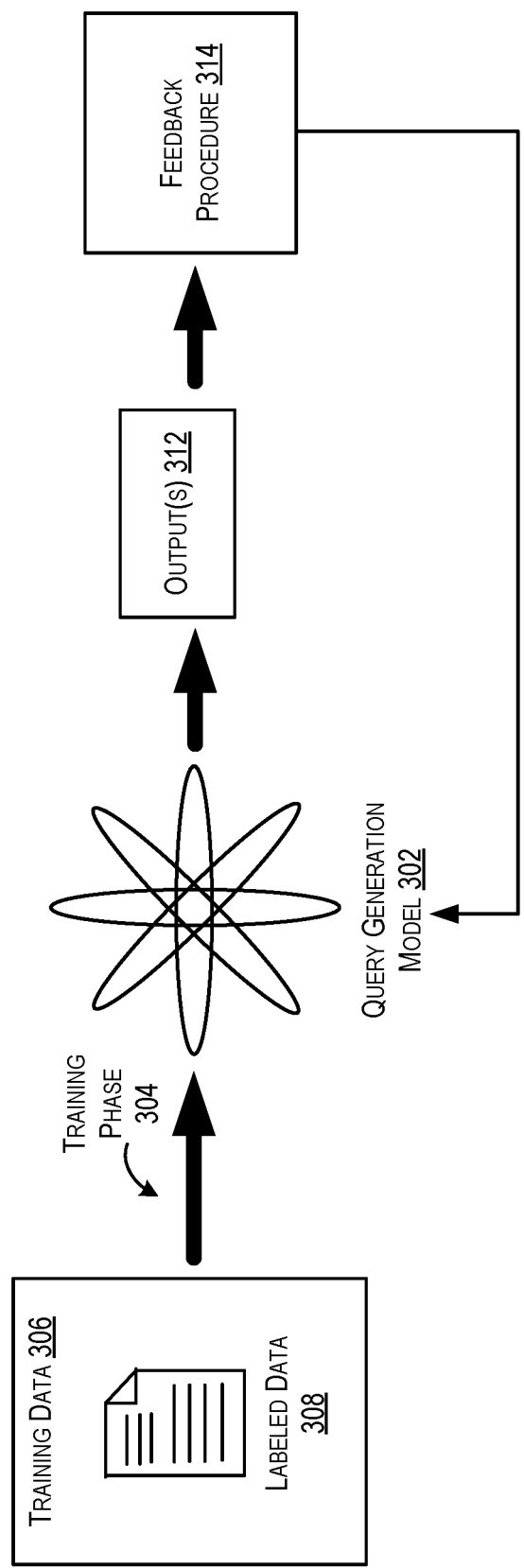
FIG. 3 is an example block diagram illustrating an example method for training a machine-learning model to generate one or more search queries that are semantically relevant to document data provided as input, in accordance with at least one embodiment.

FIG. 3 is an example block diagram illustrating an example method 300 for training a machine-learning model to generate one or more search queries that are semantically relevant to document data provided as input, in accordance with at least one embodiment. The method 300 may be performed by the index enhancing engine 102 of FIG. 1 and/or, at least partially, by a computing component separate and distinct from the index enhancing engine 102.

In some embodiments, the query generation model 302 may be trained during a training phase 304 with training data 306 and any suitable supervised machine-learning or deep-learning techniques. In some examples, query generation model 302 may be a convolutional neural network or other deep learning neural network or language model that may be trained to generate one or more search queries for document data (e.g., document content, a document index, etc.) provided as input. In some embodiments, query generation model 302 may include any suitable number of layers such as convolutional layers (e.g., configured to detect certain features of the input based on one or more filters, a layer that performs a convolution operation to input and passes the result to the next layer), rectified linear unit layers (e.g., configured to remove unwanted numbers such as negative numbers), pooling layers (e.g., layers that take a larger input and distill the input to a smaller form), and flattening layers (e.g., a layer configured to convert two-dimensional arrays from pooled features into a single, long continuous linear vector).

Training data 306 may include labeled data 308. By way of example, the labeled data 308 may be an example of the historical query data 108 discussed in connection with FIG. 1. In some embodiments, data instances of the labeled data 308 may indicate that a particular document was matched to a search query based on a particular matching technique/algorithm. As described above, a data instance of labeled data 308 may include a single search query and any suitable number of documents matched to the search query via any suitable number of respective matching techniques. In some embodiments, the labeled data 308 may be filtered or otherwise include search queries that differ from corresponding data instances by at least one lexical token (e.g., a word, a term, a phrase, etc.). The labeled data 308 may therefore include examples in which the search queries include a word, phrase, token, etc. that differs from content of the document data. This enables the query generation model 302 to be trained to generate search queries that likewise differ from corresponding data instances by at least one lexical token.

In some embodiments, the labeled data 308 may be filtered to include data instances corresponding to matches identified using a particular matching technique (e.g., semantic matching), while matches made by other techniques are discarded or ignored. In some embodiments, the labeled data 308 may be reformatted or otherwise processed to generated training data 306. By way of example, if a data instance includes a search query and multiple documents matched via semantic matching techniques, the data instance may be split into multiple training data examples, each example including the search query and one of the documents matched via the semantic matching techniques. Although the ongoing example utilizes historical user query data that indicates matches made between a historical user-defined search query and one or more documents matched to the search query and provided in a previous search result set, it should be appreciated that the documents identified in the historical query data may indicate and/or include documents that correspond to the items viewed and/or obtained (e.g., purchased, leased, etc.) by the user after submitting the search query. In some embodiments, the historical query data may include only the documents corresponding to the viewed/obtained items subsequent to submission of a given search query rather than every document identified for the respective search result set. In embodiments, in which an instance of historical query data associated more than one semantically matched document (matched based on semantically related/similar document data and/or document index) with a given search query, the historical query data may be split into multiple training data examples, each representing a unique query/document pair. In some embodiments, the search queries of the historical query data may not include tokens included in the document data and/or the search queries may include at least one token which is not included in the document data.

In some embodiments, the query generation model 302 may include any suitable number of encoders (e.g., any suitable recurrent neural networks) configured to generate a corresponding vector. As a non-limiting example, the query generation model 302 may generate, for a given training data example, a first vector representing the search query and a second vector representing the corresponding document data (e.g., the document content and/or the document index, etc.). These vectors may be passed through any suitable number of additional layers such as flattening layers (e.g., a layer configured to convert two-dimensional arrays from pooled features into a single, long continuous linear vector), fully connected layers (e.g., layers in which every input of a vector generated by one or more previous layers is connected to a corresponding portion of an output vector), and soft-max layers (e.g., a layer configured to turn values of an output vector to values that, when summed together, add up to 1 or a predefined maximum value). In some embodiments, the query generation model 302 may be configured to process sequential data. By way of example, the query generation model 302 may sequentially process each word of the search query along with the document vector to predict a probability of the next token in the search query. The query generation model 302 may include a decoder that is configured to generate a new search query.

A number of predicted words for the new search query may be identified. For example, the document vector may be passed to a decoder that may apply a softmax function applied to a number of words of a set vocabulary. A subset of those predicted words may be identified (e.g., based at least in part on the document vector) for each position of a search query. In some embodiments, the query generation model 302 may be configured to generate one or more search queries of one or more predefined token lengths.

Although not depicted, query generation model 302 may include weights corresponding to each portion of a fully connected layer. These weights express connection strengths between each value and a corresponding category or classification. The query generation model 302 may be configured with hyperparameters which may be predefined and user configurable. These hyperparameters may identify how many features of a vector are to be utilized for each convolutional layer, what window size or stride is used for each pooling layer, a number of hidden neurons to be used for each fully connected layer, or the like.

The query generation model 302 may be initialized with random or predefined weights. Feedback procedure 314 may be executed to modify these weights based at least in part on the output(s) 312 provided by the query generation model 302. Output(s) 312 (e.g., one or more new search queries generated by the query generation model 302) may be compared to the search query of the training data example. Any error found between the search query generated for that input and the known search query may be used to modify the weights of the query generation model 302. The process may be repeated any suitable number of times until error between the output(s) 312 produced by the query generation model 302 is within a threshold of accuracy to the known search queries obtained from the training data 306.

Once trained, query generation model 302 may be used to identify one or more new search queries for document data provided as input. The query generation model 302 may be provided document data (e.g., document content and/or a document index) as input and may generate one or more semantically related/similar search queries for the document data. In some embodiments, the query generation model 302 generates a semantically related search query that differs from corresponding document data by at least one lexical token (e.g., word, term, phrase, etc.). As the query generation model 302 is utilized for subsequent inputs, the subsequent output generated by the model may be added to corresponding input and used to retrain and/or update the query generation model 302. In some embodiments, an input/output pair may not be used to retrain or update the model until feedback procedure 314 is executed. In some embodiments, feedback procedure 314 may include executing any suitable operations for determining the accuracy of the output generated by query generation model 302. In some embodiments, these operations may include generating one or more relevancy, similarity scores (e.g., cosine similarity scores) between a vector generated for the new search query and the vector representing the document, or the like. In some embodiments, these operations may include determining that the new search query generated by the query generation model 302 may include at least one term/token/word lacking from the document data. In some embodiments, if a relevancy/similarity score fails to breach a threshold (e.g., where breach indicates an acceptable degree of similarity), or the new search query includes an equal number or more than a predefined acceptable number of common terms/tokens/words with the document data, the document data provided as input may be paired with the output generated by the query generation model 302 and added to the training data 306 as a negative example (e.g., an example in which the generated search query was deemed to be unacceptable/inaccurate). Alternatively, if a relevancy/similarity score indicates an acceptable predefined degree of similarity (e.g., indicates more than a threshold degree of similarity), or the new search query includes less than a predefined acceptable number of common terms/tokens/words with the document data, the document data provided as input may be paired with the output generated by the query generation model 302 and added to the training data 306 as a positive example (e.g., an example in which the generated search query was deemed acceptable/accurate).

The input provided during the feedback procedure 314 can be added to the training data 306 and/or used to retrain and/or update the query generation model 302 at any suitable time.

Figure 4:
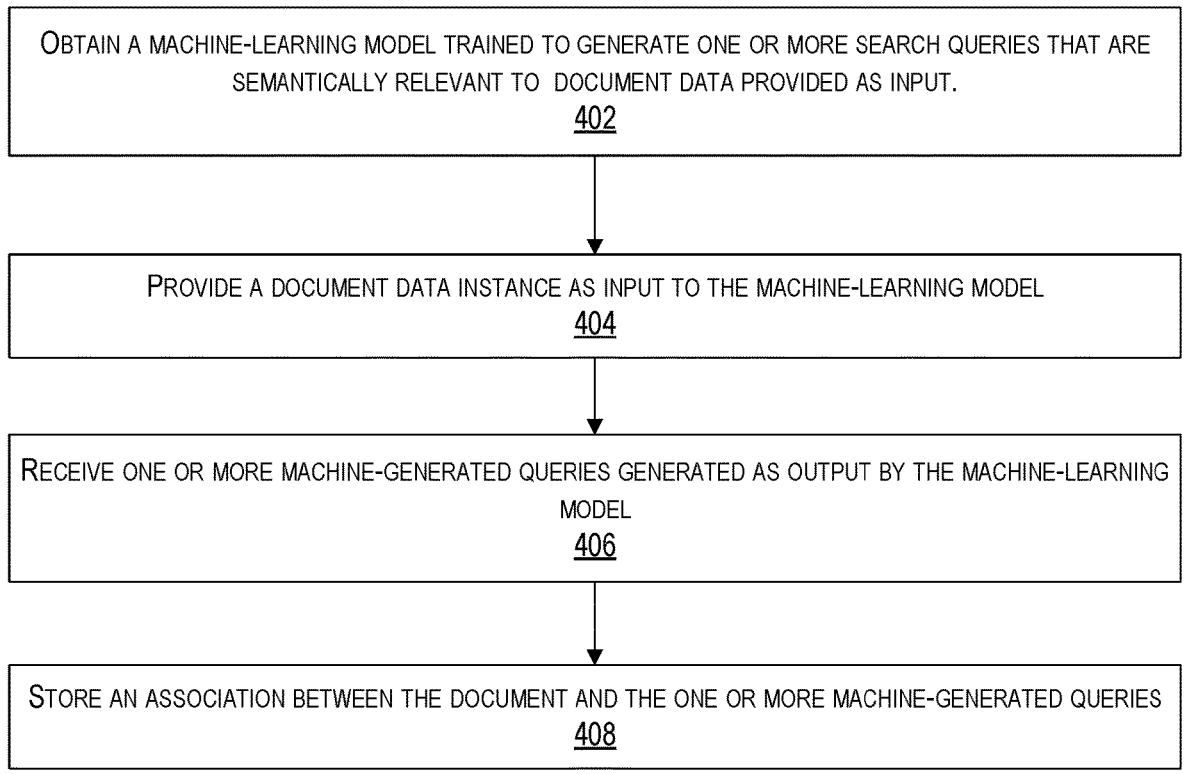
FIG. 4 is a block diagram illustrating an example method for enhancing a document index, in accordance with at least one embodiment.

FIG. 4 is a block diagram illustrating an example method 400 for enhancing a document index, in accordance with at least one embodiment. The method 400 may be performed by the index enhancing engine 102 of FIG. 1 and/or, at least partially, by a computing component separate and distinct from the index enhancing engine 102.

The method 400 may begin at 402, where a machine-learning model is obtained. The machine-learning model (e.g., query generation model 302 of FIG. 3, query generation model 118 of FIG. 1) may be trained to generate one or more search queries that are semantically relevant to document data (e.g., document content and/or a document index) provided as input.

At 404, a document data instance may be provided as input to the machine-learning model. As a non-limiting example, the document data instance may be identified as part of a discovery process performed according to a predefined frequency and/or according to a predefined triggering criteria or predefined schedule. As a non-limiting example, adding a document to an electronic catalog of items (e.g., corresponding to the data store 136 of FIG. 1) may be determined to be a triggering event (according to predefined triggering criteria) that causes the document data to be provided as input to the machine-learning model. As another example, a discovery process may identify a set of popular items (e.g., items that are viewed and/or procured/consumed over a threshold number of times in a predefined historical time period such as the last day, week, month, year, etc.). Documents corresponding to these items (e.g., documents that specify the items' attributes/attribute values corresponding to a title, a product description, an item review, a color, a size, a price, or any suitable item attribute) may be individually provided as input to the machine-learning model at 404.

At 406, one or more machine-generated search queries may be provided as output by the machine-learning model.

At 408, an association between any suitable combination document, document content, or document index may be stored. As a non-limiting example, at least one machine-generated search query produced by the machine-learning model may be stored in a map identifying search queries associated with respective documents. As another example, any suitable number of the machine-generated search queries may be added to the document index associated with the document.

Figure 5:
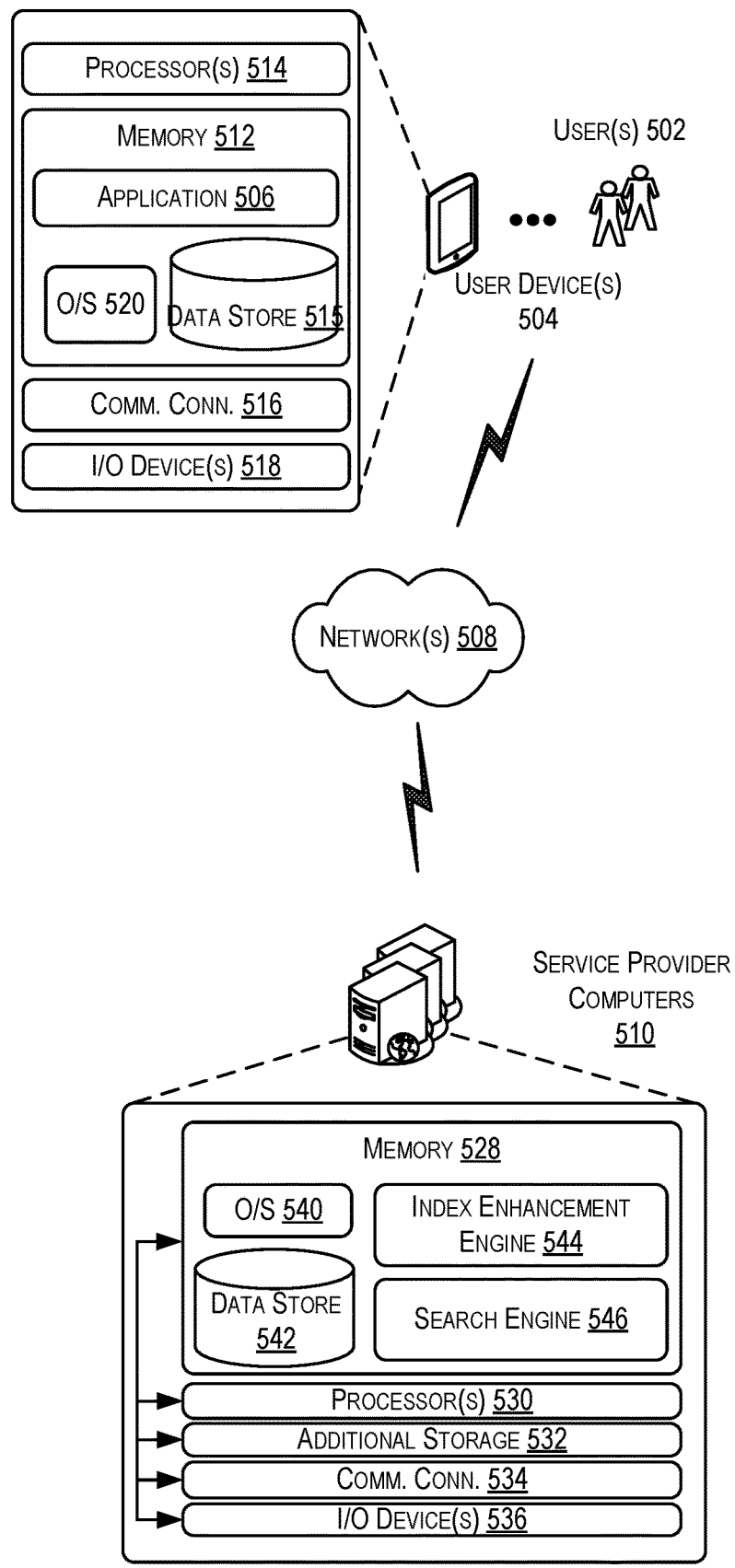
FIG. 5 illustrates components of a system, including an index enhancement engine and a search engine, that may perform functions in accordance with at least one embodiment.

FIG. 5 illustrates components of a system 500, including an index enhancement engine (e.g., index enhancement engine 544, an example of index enhancement engine 102 of FIG. 1) and a search engine (e.g., search engine 546), that may perform functions in accordance with at least one embodiment. In system 500, one or more users 502 may utilize a user device (e.g., a user device of a collection of user devices 504 to navigate to a network page provided by the service provider computers 510 (individually, examples of the service provider computer(s) 104 of FIG. 1). For example, the user may access a user interface accessible through an application 506 running on the user devices 504 via one or more networks 508. The application 506 operating on the user devices 504 may be hosted, managed, and/or provided by a computing resources service or service provider, such as by utilizing one or more service provider computers 510.

In some examples, the networks 508 may include any one or a combination of many different types of networks, such as cable networks, the Internet, wireless networks, cellular networks, and other private and/or public networks. While the illustrated example represents the users 502 accessing application functionality over the networks 508, the described techniques may equally apply in instances where the users 502 interact with the service provider computers 510 via the one or more user devices 504 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 506 may allow the users 502 to interact with the service provider computers 510 so as to provide the various functionality described above. For example, a user may utilize the application 506 to browse for various items within an electronic catalog. In at least one example, the application 506 may provide a user interface with which users 802 may submit user queries. These user queries (user-defined search queries) may be received by the search engine 546 and utilized to identify a search result set from document data instances (e.g., document content and/or a document index) corresponding to and/or representing various items of the electronic catalog. The search engine 546 may execute, for example, the method 200 of FIG. 2. In some embodiments, search engine 546 may be configured to apply the lexical matching techniques between the search query submitted by the user and a machine-generated search query associated with the document and/or included as part of the document index.

The service provider computers 510, perhaps arranged in a cluster of servers or as a server farm, may host the application 506 operating on the user devices 504 and/or cloud-based software services. Other server architectures may also be used to host the application 506 and/or cloud-based software services. The application 506 operating on the user devices 504 may be capable of handling requests from the users 502 and serving, in response, various user interfaces that can be rendered at the user devices 504. The application 806 operating on the user devices 504 can present any suitable type of website that supports user interaction, including search engine sites, electronic catalogs from which item detail pages are viewable and/or from which items may be procured, and the like. The described techniques can similarly be implemented outside of the application 506, such as with other applications running on the user devices 504.

The user devices 504 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 504 may be in communication with the service provider computers 510 via the networks 508, or via other network connections.

In one illustrative configuration, the user devices 504 may include at least one memory 512 and one or more processing units (or processor(s)) 514. The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described.

The memory 512 may store program instructions that are loadable and executable on the processor(s) 514, as well as data generated during the execution of these programs. Depending on the configuration and type of user computing device, the memory 512 may be volatile (such as random-access memory (RAM)) and/or non-volatile (such as read-only memory (ROM), flash memory, etc.). The user devices 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random-access memory (SRAM), dynamic random-access memory (DRAM), or ROM.

Turning to the contents of the memory 512 in more detail, the memory 512 may include an operating system 520, one or more data stores 515, and one or more application programs, modules, or services. The application 506 may be configured to receive, store, and/or display a network page or other user interface for interacting with the service provider computers 510. Additionally, the memory 512 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 504 may also contain communications connection(s) 516 that allow the user devices 504 to communicate with a stored database, another computing device or server (e.g., the service provider computers 510), user terminals and/or other devices on the networks 508. The user devices 504 may also include I/O device(s) 518, such as a keyboard, a mouse, a pen, a voice input device, a touch input device, a display, speakers, a printer, etc.

In some aspects, the service provider computers 510 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 510 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 510 may be in communication with the user devices 504 via the networks 508 or via other network connections. The service provider computers 510 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computers 510 may include at least one memory 528 and one or more processing units (or processor(s)) 530. The processor(s) 530 may be implemented as appropriate in hardware, computer-executable instructions, firmware, or combinations thereof. Computer-executable instruction or firmware implementations of the processor(s) 530 may include computer-executable or machine-executable instructions written in any suitable programming language to perform the various functions described.

The memory 528 may store program instructions that are loadable and executable on the processor(s) 530, as well as data generated during the execution of these programs. Depending on the configuration and type of service provider computers 510, the memory 528 may be volatile (such as RAM) and/or non-volatile (such as ROM, flash memory, etc.). The service provider computers 510 or servers may also include additional storage 532, which may include removable storage and/or non-removable storage. The additional storage 532 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 528 may include multiple different types of memory, such as SRAM, DRAM, or ROM.

The memory 528, the additional storage 532, both removable and non-removable, are all examples of computer-readable storage media. For example, computer-readable storage media may include volatile, or non-volatile, removable or non-removable media implemented in any method or technology for storage of information such as computer-readable instructions, data structures, program modules, or other data. The memory 528 and the additional storage 532 are all examples of computer storage media. Additional types of computer storage media that may be present in the service provider computers 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 510. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 510 may also contain communications connection(s) 534 that allow the service provider computers 510 to communicate with a stored database, another computing device or server, user terminals and/or other devices on the networks 508. The service provider computers 510 may also include I/O device(s) 536, such as a keyboard, a mouse, a pen, a voice input device, a touch input device, a display, speakers, a printer, etc.

Turning to the contents of the memory 528 in more detail, the memory 528 may include an operating system 540, one or more data stores 542, and/or one or more application programs, modules, or services for implementing the features disclosed herein, such as the features provided by the index enhancing engine 544 (an example of the index enhancing engine 102 of FIG. 1).

Figure 6:
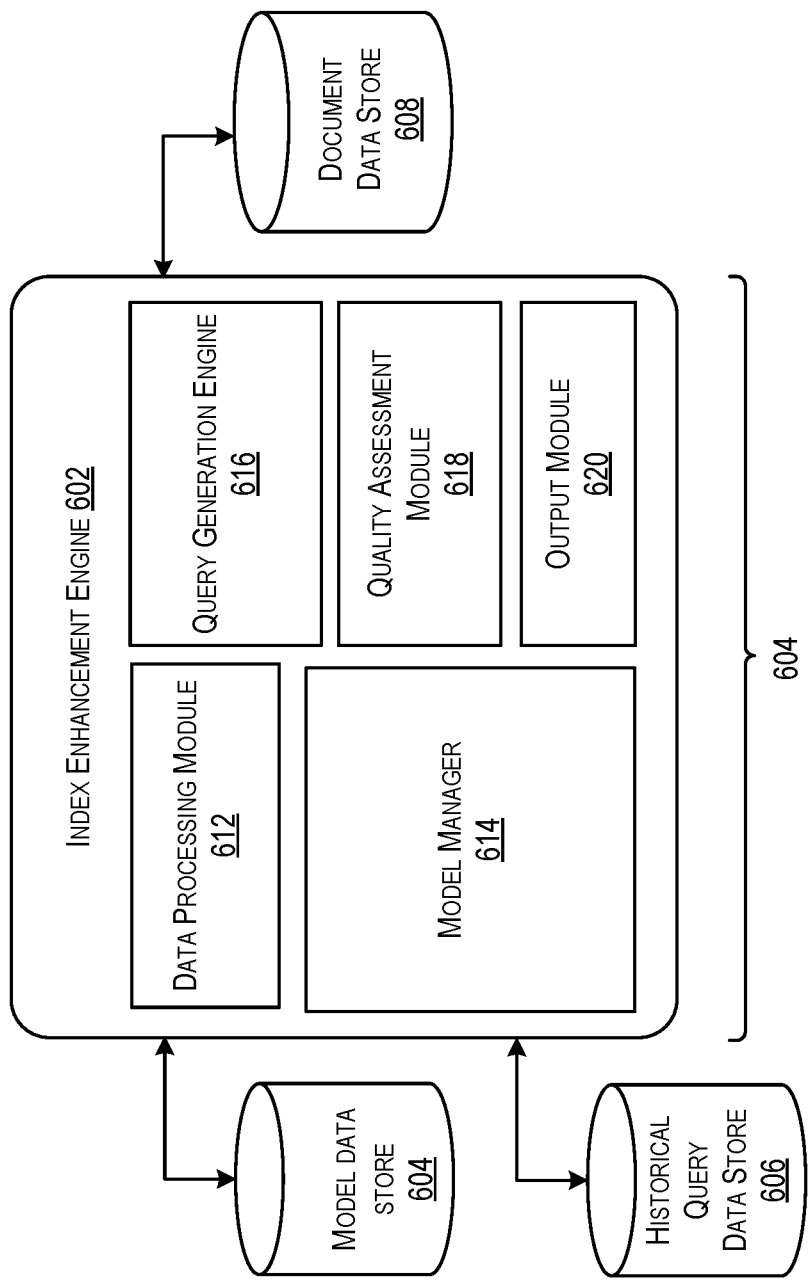
FIG. 6 is a schematic diagram of an example computer architecture for the index enhancement engine, including a plurality of modules that may perform functions in accordance with at least one embodiment.

FIG. 6 is a schematic diagram of an example computer architecture 600 for the index enhancement engine (e.g., index enhancement engine 602, an example of the index enhancing engine 102 of FIG. 1, the index enhancing engine 544 of FIG. 5, etc.), including a plurality of modules (e.g., modules 604) that may perform functions in accordance with at least one embodiment. The modules 604 may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for providing functionality corresponding to the module described below. The modules 604 may be exist as part of the index enhancement engine 602, or the modules 604 may exist as separate modules or services external to the index enhancement engine 602.

In the embodiment shown in the FIG. 6, data stores such as model data store 604, historical query data store 606, and document data store 608 are shown, although data can be maintained, derived, or otherwise accessed from various data stores, either remote or local to the index enhancement engine 602, to achieve the functions described herein. The index enhancement engine 602, as shown in FIG. 6, includes various modules such as a data processing module 612, a model manager 614, a query generation engine 616, a quality assessment module 618, and an output module 620. Some functions of the modules 612-620 are described below. However, for the benefit of the reader, a brief, non-limiting description of each of the modules is provided in the following paragraphs. In accordance with at least one embodiment, a process is enabled for enhancing a document index with one or more machine-generated search queries that are configured to be semantically relevant to the document.

In at least one embodiment, the index enhancement engine 102 includes the data processing module 612. Generally, the data processing module 612 may be utilized to receive any suitable information with respect to any example provided herein. By way of example, the data processing module 612 may be configured to receive training data examples obtained from historical query data store 606 as part of a process conducted to train a machine-learning model (e.g., the query generation model 118 of FIG. 1).

The index enhancement engine 602 may include the model manager 614. The model manager 614 may be configured to perform any suitable portion of the operations discussed above in connection with method 300 for training a machine-learning model (e.g., the query generation model 118). In some embodiments, the model manager 614 may be configured to assess the accuracy of said model and/or to perform the feedback procedure 314 discussed in connection with FIG. 3. In some embodiments, the model manager 614 may be configured to store the model(s) in model data store 604 for subsequent use.

The model manager 614 may train any suitable number of models for query generation. By way of example, the model manager 614 may utilize the method 300 to train location and/or context specific models. It may be the case that a service provider offers multiple, location specific electronic catalogs. The historical query data used to train a given model may be location/context specific. By way of example, historical query data of a given location specific electronic catalog may be used to train a model. As discussed above, behavioral data (e.g., data identifying which items/documents were viewed and/or procured) associated with that electronic catalog may be utilized to tune the model to factor in location-specific behavioral data. Therefore, one model may be trained for one location/context while another may be trained for a different location/context. As another example, a global model may be trained using the operations discussed above in connection with method 300. The historical query data may include behavioral data that is not specific to a given location, context, or electronic catalog. The resultant model may be used in a global manner, regardless of location and/or context.

The model manager 614 may configured to periodically assess new training examples (e.g., based on output provided by the query generation engine 616) an add these training examples as part of the feedback procedure 314. In some embodiments, feedback procedure 314 may be performed by the quality assessment module 618.

Query generation engine 616 may be configured utilize the model(s) trained by model manager 614 to generate output (e.g., a machine-generated search query) for a given instance of document data (e.g., content 124 of FIG. 1, index 126 of FIG. 1, each an example of document data corresponding to document 122 of FIG. 1). In some embodiments, the document data may be stored in document data store 608 and retrieved by the query generation engine 616 or the document data may be retrieved by the data processing module 612 and provided to the query generation engine 616. Document data instances may be identified periodically, based at least in part on any suitable schedule, or in response to any suitable predefined criteria. As a non-limiting example, a document may be added to an electronic catalog. The process for adding the document to the electronic catalog may include storing the document/document data within document data store 608 (e.g., a data store configured to store an inventory of documents representing items of the electronic catalog). In some embodiments, the document data corresponding to the document may be identified based at least in part on detecting that the document was recently stored in the document data store 608. For example, the query generation engine 616 may be configured to periodically obtain recently added documents and corresponding document data (e.g., corresponding to documents added to the document data store 608 within a threshold period of time such as the last hour, the last 24 hours, the last week, etc.). Additionally, or alternatively, a computing component that adds the document to the document data store 608 may be configured to transmit an indication or otherwise trigger the functionality of the query generation engine 616 (e.g., based at least in part on a function call, an application programming interface provided by the index enhancement engine 602, etc.). In some embodiments, a subset of the document data store 608 may be identified and only this subset of the document data store 608 may be used for query generation at a given time. For example, documents corresponding to items that have been viewed and/or procured from the electronic catalog over a threshold number of times in a given historical time period (referred to as "popular items") may be identified from behavioral data associated with the document. This behavioral data may be stored in the document data store or within a separate data store (not depicted). The query generation engine 616 may provide each instance of document data corresponding to the documents identified as input to the model trained by model manager 614. The model and/or parameters of the model may be obtained by the query generation engine 616 from the model data store 604.

Quality assessment module 618 may be utilized to execute any suitable operations for assessing the quality of model output. As a non-limiting example, the output generated for a given document data instance, along with the document data for that instance, may be provided to the quality assessment module 618 by the query generation engine 616. In some embodiments, quality assessment module 618 may be configured to enforce a number of predefined criteria for the machine-generated search query. By way of example, the quality assessment module 618 may be configured to deem machine-generated search queries that include at least one token that differs from the document data as having an acceptable degree of quality. The predefined criteria may vary. For example, the predefined criteria may specify that the machine-generated search query must include a particular threshold of tokens that differ from the tokens of the document data, that all tokens of the search query differ from all tokens of the document data, that a percentage or ratio of tokens of the search query differ from all tokens of the document data, or the like. Additionally, or alternatively, the quality assessment module 618 may be configured to execute any suitable relevancy score calculations to quantify a degree of relevancy between the machine-generated search query and the document data. This may include providing any suitable portion of the machine-generated search query to one or more predefined relevancy models that have been pretrained to determine a degree of relevancy (e.g., a relevancy score) between to inputs (e.g., between the search query and the item represented by the document data). In some embodiments, the quality assessment module 618 may be configured to reject machine-generated search queries that are assigned a relevancy score that fails to meet or breach a predefined threshold value. Rejected machine-generated search queries may be discarded. This may cause the machine-generated search query and document data to be excluded from training data examples that are added to the training data set with which the query generation model may be subsequently updated and/or retrained. In some embodiments, rejecting a machine-generated search query may discard the machine-generated search query, forgoing further processing by the output module 620.

Output module 620 may be configured to receive (e.g., from the quality assessment module 618, from the query generation engine 616, etc.) machine-generated search queries corresponding to one or more instance of document data. As described above, the received search queries may correspond to ones that have been assessed (e.g., by the quality assessment module 618) as being of high quality (e.g., meeting predefined criteria, having at least a threshold degree of relevance with the document data, etc.). The output module 620 may be configured to associate the machine-generated search query with the document/document data. In some embodiments, a data field associated with the document such as a header, the content of the document, a document index, a mapping configured to maintain an association between an identifier of the document and one or more associated machine-generated search queries, or the like, may be updated by the output module 620 to include the search query generated by the model based at least in part on the document data. As a non-limiting example, the machine-generated search query may be added to a document index for the document, enabling subsequent search techniques (e.g., lexical matching techniques, semantic matching techniques, etc.) employed by the search engine 546 of FIG. 5 to utilize the machine-generated search query to identify matches for subsequent user-defined search queries.

Figure 7:
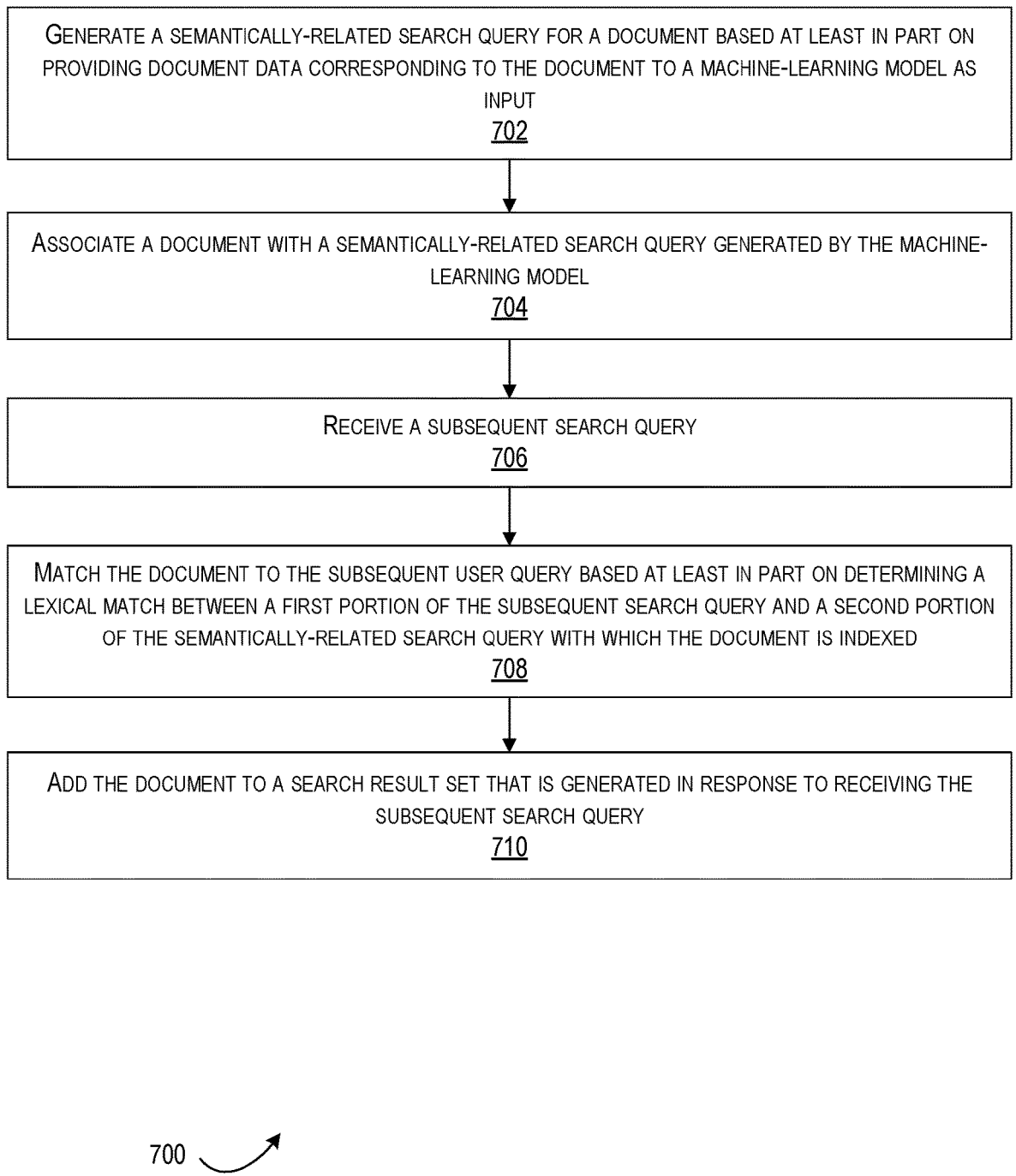
FIG. 7 is a block diagram illustrating an example method for semantically relevant search items, in accordance with at least one embodiment.

FIG. 7 is a block diagram illustrating an example method for providing semantically relevant search items, in accordance with at least one embodiment. A non-transitory computer-readable storage medium may store computer-executable instructions that, when executed by at least one processor, cause at least one computer to perform instructions comprising the operations of the method 700. It should be appreciated that the operations of the method 700 may be performed in any suitable order, not necessarily the order depicted in FIG. 7. Further, the method 700 may include additional, or fewer operations than those depicted in FIG. 7. The operations of method 700 may be performed by any suitable portion of system 500 (e.g., by any suitable combination of the index enhancement engine 544, the search engine 526, the user devices 504, etc.). In some embodiments, method 700 may be executed by components of service provider computers 510 of FIG. 5.

The method 700, may begin at 702, where a semantically-related search query is generated for a document (e.g., document 122 of FIG. 1) based at least in part on providing document data (e.g., any suitable combination of the content 124 of FIG. 1, index 126 of FIG. 1, etc.) corresponding to the document to a machine-learning model (e.g., query generation model 118 of FIG. 1, query generation model 302 of FIG. 3, etc.). In some embodiments, the semantically-related search query comprises at least one token that lexically differs from the document data. The machine-learning model may be previously trained (e.g., by the model manager 614 of FIG. 6) to generate a semantically-related search query for instances of document data provided as input. A semantically-related search query refers to a search query that would be identified as being semantically similar to document data should the two be assess utilizing a semantic matching algorithm. For example, a semantically relevant search query may be identified as being semantically similar to document data when respective vectors generated from the two (as described in connection with method 200) are determined to be less than a threshold distance apart (e.g., that a cosine similarity score indicates a distance that falls under a predefined threshold distance value) as described in FIG. 2.

At 705, a document may be indexed or otherwise associated (e.g., by the output module 620) with a semantically-related query generated by the machine-learning model. In some embodiments, the semantically-related search query being generated by the machine-learning model as output in response to being provided document data associated with the document as input. The document may represent an item that has been newly added to an electronic catalog of items. The document may lack a machine-generated search query (e.g., a semantically-related search query). In some embodiments, the document may be selected from any suitable set of documents (e.g., the documents representing the items of the electronic catalog) based at least in part on identifying that the document/item has been newly added, identifying that the document lacks a machine-generated search query (e.g., a semantically-related search query), identifying that the a document of a specific type (e.g., corresponding to a popular item) that currently lacks a machine-generated search query (e.g., a semantically-related search query), or based at least in part on any suitable selection criteria.

At 706, a subsequent search query may be received (e.g., by the data processing module 612 of FIG. 6). This search query may be provided via any suitable interface provided by the service provider computer(s) 104 of FIG. 1 (of which service provider computers 510 of FIG. 5 are examples). By way of example the search query may be provided via a search bar of a user interface provided by the service provider computer(s) 104 as part of hosting the electronic catalog of items.

At 708, the document may be matched to the subsequent user query (e.g., by the search engine 546 of FIG. 5) based at least in part on determining a lexical match between a first portion of the subsequent search query and a second portion of the machine-generated search query with which the document is indexed. In some embodiments, determining a lexical match may include determining that the subsequent search query includes tokens that are shared/similar to the tokens of the machine-generated search query associated with the document. As a non-limiting example, a lexical match may be identified between a token of the subsequent search query and a token included in the machine-generated search query that is not included in the document data. In some embodiments, a match may be identified when one or more common tokens are identified. In other embodiments, a match may be identified only when all tokens of the subsequent search result match (some or all) tokens of the machine-generated search query.

At 710, the document may be added to a search result set that is generated in response to receiving the subsequent search query. The search result set may be ranked and/or ordered according to any suitable ranking/ordering protocol and based on relevance, popularity, or any suitable feature of the documents of the search result set.

Figure 8:
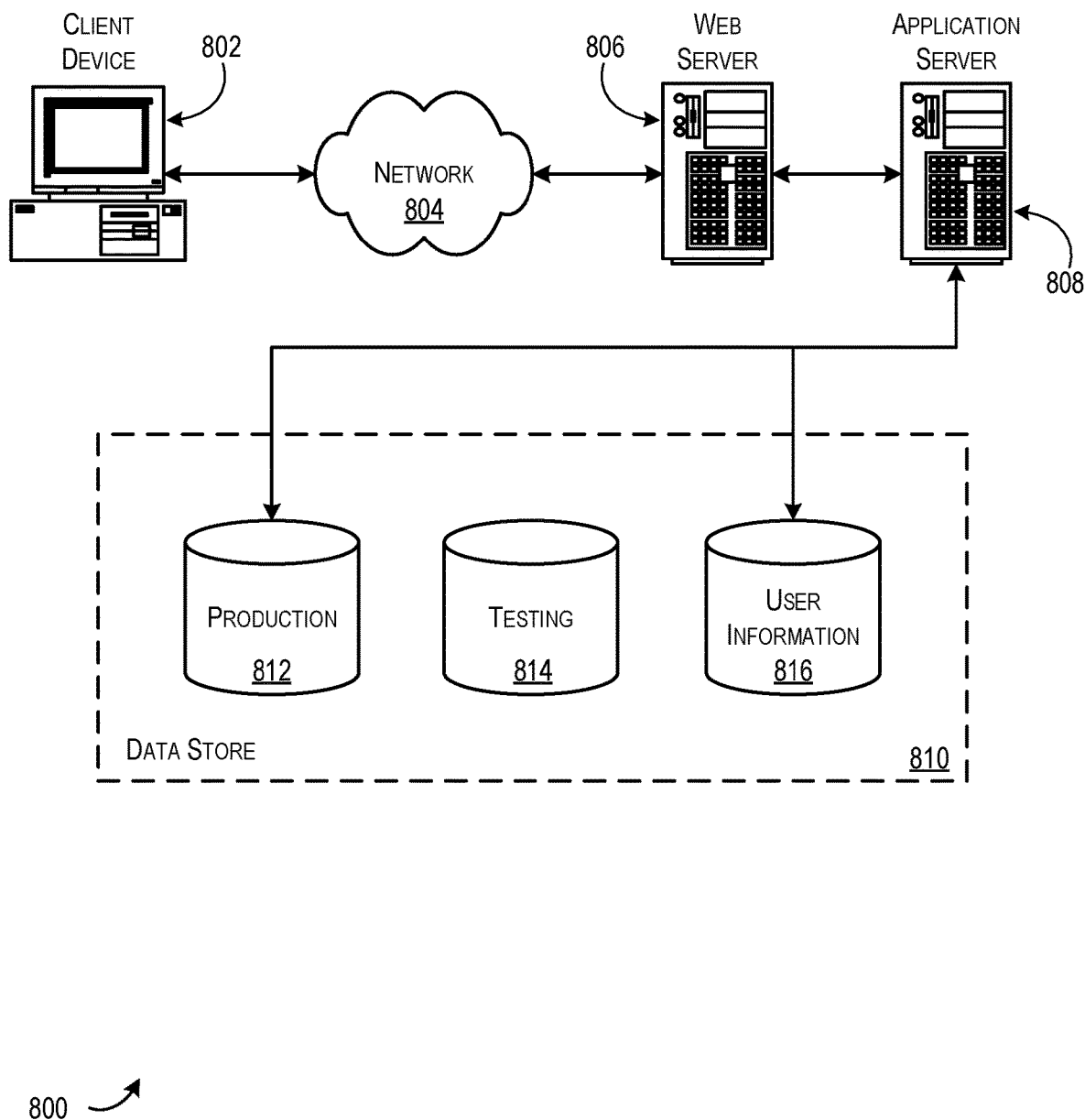
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and Apple Talk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   training, by a computing system, a machine-learning model to generate semantically-related search queries for corresponding instances document data provided as input, each semantically-related search query being generated to comprise a lexical token lacking in the 4 corresponding instances of document data, the machine-learning model being trained based at least in part on a supervised machine-learning algorithm and a training data set comprising historical query data, an instance of historical query data comprising a historical search query and a corresponding set of document data instances identified based at least in part on the historical search query;
   obtaining, by the computing system, a set of document data instances from a plurality of documents representing items of an electronic catalog of items;
   providing, by the computing system, a respective document data instance of the set of document data instances to the machine-learning model as input;
   receiving, by the computing system as output from the machine-learning model, a semantically-related search query for the respective document data instance of the set of document data instances, the semantically-related search query being semantically related to the respective document data instance and comprising one or more lexical tokens lacking from the respective document data instance;
   indexing, by the computing system, a document corresponding to the respective document data instance with the semantically-related search query;
   receiving, by the computing system, a subsequent search query;
   identifying, by the computing system for the subsequent search query, a search result set comprising documents selected from the plurality of documents representing the items of the electronic catalog of items, the search result set comprising the document based at least in part on identifying a lexical match between the subsequent search query and the semantically-related search query with which the document is indexed; and providing, by the computing system, the search result set in response to the subsequent search query.

2. The computer-implemented method of claim 1, wherein each historical query data instance comprises document data instances that were identified as matching a given historical search query based at least in part on one or more semantic matching algorithms.

3. The computer-implemented method of claim 2, wherein the historical query data is selected from a collection of historical query data instances, wherein respective historical query data instances of the collection of historical query data instance comprise matches identified based at least in part on a lexical matching algorithm.

4. The computer-implemented method of claim 1, wherein the respective document data instance provided as input to the machine-learning model comprises a document index.

5. The computer-implemented method of claim 1, wherein indexing the document comprises adding the semantically-related search query to a document index associated with the document.

6. The computer-implemented method of claim 1, further comprising:
identifying, by the computing system, one or more document data instances of the corresponding set of documents data instances that were matched to the historical search query based at least in part on one or more lexical matching algorithms; and
prior to training the machine-learning model, removing, by the computing system, the one or more document data instances matched to the historical search query based at least in part on the one or more lexical matching algorithms from the corresponding set of document data instances of the training data set.

7. The computer-implemented method of claim 1, wherein identifying the lexical match comprises identifying that a first portion of the subsequent search query matches at least one of the one or more lexical tokens of the semantically-related search query.

8. The computer-implemented method of claim 1, wherein identifying the lexical match comprises identifying an exact match between the subsequent search query and the semantically-related search query.

9. A computing system, comprising:
one or more processors; and
a memory storing computer-executable instructions that, when executed by the one or more processors, causes the computing system to:
generate a semantically-related search query for a document based at least in part on providing document data corresponding to the document to a machine-learning model as input, the semantically-related search query comprising at least one token that lexically differs from the document data, the machine-learning model being previously trained to generate semantically-related search queries that lexically differ from input data;
associate the document with the semantically-related search query generated by the machine-learning model;
receive a subsequent search query;
match the document to the subsequent search query based at least in part on determining a lexical match between a first portion of the subsequent search query and a second portion of the semantically-related search query with which the document is associated; and
add the document to a search result set that is generated in response to receiving the subsequent search query.

10. The computing system of claim 9, wherein the machine-learning model is trained to generate the semantically-related search queries based at least in part on a training data set comprising historical search queries that were matched to one or more identified documents using a semantic matching algorithm, and wherein a corresponding historical search query differs from respective matched documents by at least one lexical token.

11. The computing system of claim 10, wherein the corresponding historical query data instance includes behavioral data indicating user selections of the one or more identified documents.

12. The computing system of claim 9, wherein the machine-learning model is one of a plurality of machine-learning models, each of the plurality of machine-learning models being trained with location-specific historical query data.

13. The computing system of claim 9, wherein a search query generated by the machine-learning model is configured to be semantically related to corresponding document data for which it is generated, wherein the search query and the corresponding document data are identified as being semantically related when a distance between respective vectors generated for each of the search query and the corresponding document data are identified as being less than a threshold distance apart.

14. The computing system of claim 9, wherein executing the computer-executable instructions further causes the computing system to add the semantically-related search query and corresponding document data for which it was generated to a training data set with which the machine-learning model is subsequently retrained or updated.

15. A non-transitory computer readable storage medium comprising one or memories storing computer-executable instructions that, when executed with one or more processors of a computing device, cause the computing device to:
obtain a machine-learning model that has been previously trained to generate a semantically-related search query comprising at least one token that lexically differs from an instance of document data provided as input, the machine-learning model being trained with a training data set comprising historical query data, an instance of historical query data specifying a historical search query and one or more documents of a search result set identified in response to the historical search query;
identify a document lacking a machine-generated search query;
generate the semantically-related search query for the document based at least in part on providing document data corresponding to the document to the machine-learning model as input and receiving the semantically-related search query for the document as output from the machine-learning model;
associated the document with the machine-generated search query;
receive a subsequent search query; and
identify the document as part of a search results set for the subsequent search query based at least in part on determining a degree of similarity between the subsequent search query and the semantically-related search query associated with the document.

16. The non-transitory computer readable storage medium of claim 15, wherein associating the document with the semantically-related search query comprises assigning a data field corresponding to a document index a value corresponding to the semantically-related search query.

17. The non-transitory computer readable storage medium of claim 15, wherein determining the degree of similarity between the subsequent search query comprises identifying, based at least in part on a lexical matching algorithm, that the subsequent search query and the semantically-related search query share one or more common tokens.

18. The non-transitory computer readable storage medium of claim 15, wherein the machine-learning model is configured to generate a plurality of semantically-related search queries for the document.

19. The non-transitory computer readable storage medium of claim 18, wherein executing the computer-executable instructions further causes the computing device to associate the document with each of the plurality of semantically-related search queries generated by the machine-learning model for the document.

20. The non-transitory computer readable storage medium of claim 19, wherein executing the computer-executable instructions further causes the computing device to modify the training data set prior to training the machine-learning model, wherein modifying the training data set comprises generating a first training data set example and a second training data set example from a historical search query instance comprising a particular historical search query and a first document data corresponding to a first document and second document data corresponding to a second document, the first and second documents being identified as being semantically-related the particular historical search query, wherein the first training data set example comprises the historical search query and the first document data and the second training data set example comprises the historical search query and the second document data.

* * * * *